Patented July 8, 1952

2,602,816

UNITED STATES PATENT OFFICE 2,602,816

METHOD FOR PREPARING SULFUR-CONTAINING CARBOXYLIC ACIDS

James T. Gregory, Cuyahoga Falls, and Jacob E. Jansen, Akron, Ohio, assignors to The B. F. Goodrich Company, New York, N. Y., a corporation of New York No Drawing. Application June 18, 1947, Serial No. 755,477

4 Claims. (Cl. 260—537)

This invention relates to a method for the preparation of sulfur-containing carboxylic acids, and pertains more specifically to the preparation of such compounds by the reaction of a chlorinated hydrocarbon with a mercapto-substituted aliphatic carboxylic acid.

With halogenated hydrocarbons the order of activity decreases in passing from the iodide to the fluoride, from tertiary to primary compounds, and from compounds containing one carbon atom to compounds containing two or more carbon atoms. Consequently, chlorinated hydrocarbons, and especially the primary compounds containing two or more carbon atoms, show unusual stability and ordinarily undergo metathetical reactions with other organic compounds very slowly or not at all. As a result it is generally necessary to employ a bromine or iodine-containing compound if it is desired to replace the halogen of a halogenated hydrocarbon with an organic structure. It is very undesirable, however, to use the bromine or iodine-containing hydrocarbons since they are very much more expensive and more difficult to obtain than the corresponding chlorinated hydrocarbons.

We have now found, however, that a chlorinated hydrocarbon of the formula $A(Cl)_x$, wherein A is a hydrocarbon radical having its connecting valences on saturated carbon atoms, and $x$ is a number equal to the valence of A, generally from 1 to 4, readily reacts with a mercapto-acid of the formula HS—R—COOH, wherein R is a bivalent aliphatic hydrocarbon radical, in an aqueous medium in the presence of an alkali metal hydroxide, such as NaOH and KOH, to form an alkali metal salt of a sulfur-containing carboxylic acid from which, on addition of a strong mineral acid, such as HCl and H₂SO₄, there is obtained a free sulfur-containing carboxylic acid of the general formula:

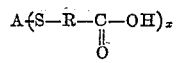

wherein A, R, and $x$ have the same meaning set forth above.

The ease with which such chlorinated hydrocarbons and such mercapto-acids may be reacted, according to this invention, makes this reaction a very valuable one for the production of various sulfur-containing mono- and poly-carboxylic acids, which are extremely useful organic compounds. The acids and their water-soluble salts are useful as plant growth stimulants and as inhibitors of rancidity in edible animal and vegetable oils, and esters of the acids are excellent plasticizers for synthetic resins such as polyvinyl chloride.

It is desirable that the chlorinated hydrocarbon compound which is used in the reaction of this invention contain less than 12 carbon atoms, and preferably fewer than 8. However, compounds containing more than 12 carbon atoms may also be used.

The preferred chlorinated hydrocarbon compounds which are used in the reaction are compounds which possess the formula Cl—A—Cl, wherein A is an aliphatic hydrocarbon radical which may be either be straight-chain or branched and which may have its connecting valences on the same or different carbon atoms. Included among these compounds are, dichloromethane, 1,2-dichloroethane, 1,3-dichloropropane, 1,4-dichlorobutane, 1,1-dichloropropane, 1,2-dichloropropane, 2,2-dichloropropane, 1,1-dichloroethane, 1,3 - dichloro - 2 - methylbutane, 2,3 - dichloro - 2-methylbutane, and other similar dichlorinated hydrocarbons which may be prepared by halogenating parent hydrocarbons including pentanes, hexanes, heptanes, octanes, decanes and dodecanes.

Other chlorinated hydrocarbons which are used include alkyl chlorides such as chloromethane, 1-chloropropane, 2-chloropropane, 1-chloro-2,2-dimethyl propane, 2-chloro-2-methyl propane, 1 - chlorobutane, 2 - chlorobutane, 1 - chloro - 2 - methyl-butane, 1-chloro-3-methyl-butane, 2-chloro - 2 - methylbutane, 1 - chloropentane, 2 - chloropentane, 3 - chloropentane, 1 - chlorohexane, 2 - chlorohexane, 1 - chloroheptane, 1 - chloro-octane, 2 - chloro-octane, isopropyl chloride, isobutyl chloride, and the like;

Unsaturated chlorinated hydrocarbon compounds in which the chlorine atom or atoms are attached only to saturated carbon atoms, such as allyl chloride, methallyl chloride, primary isoprene monohydrochloride, tertiary isoprene monohydrochloride, and other similar unsaturated chlorinated hydrocarbon compounds which may be prepared by halogenating parent hydrocarbons such as butenes, pentenes, hexenes, heptenes, and the like;

Tri-chlorinated hydrocarbons such as trichloromethane, 1,1,2-tri-chloroethane, 1,1,1-trichloroethane, 1,2,3-tri-chlorobutane, and the like;

Tetra-chlorinated hydrocarbons, such as carbon tetrachloride, 1,1,2,2-tetra-chloroethane and the like;

Chlorinated aralkyl hydrocarbons such as benzyl chloride, benzal chloride and the like;

Chlorinated alicyclic hydrocarbons in which the chlorine is attached to saturated carbon atoms such as chlorocyclohexane, 1,2-dichlorocyclohexane and the like.

Thus it can be seen that the invention is applicable to all chlorinated hydrocarbons in which the chlorine atoms are attached only to saturated carbon atoms. A saturated carbon atom is one which is connected to four different atoms by single valences, as distinguished from carbon atoms having an unsaturated linkage (i. e., two or three valences), connected to a single atom.

The mercapto-acids which are used in the reaction of this invention possess the formula $$HS-R-\overset{\underset{\|}{O}}{C}-OH$$

wherein R is alkylene and include mercaptoacetic acid, alpha- and beta-mercaptopropionic acid, alpha-, beta- and gamma-mercaptobutyric acid, omega-mercapto valeric acid, omega-mercapto caproic acid, omega-mercapto enanthic acid, omega-mercapto caprylic acid and the like.

Among the compounds which are prepared according to the reaction of this invention are those listed below together with a suitable method of preparation. NaCl and water are also, of course, formed in the reaction. (The nomenclature used is that given in Chemical Abstracts, 39, page 5924, paragraph 297.)

1.
$$2\text{HOOC}-\text{CH}_2-\text{CH}_2-\text{SH} + \text{ClCH}_2-\text{CH}_2-\text{Cl} + 4\text{NaOH} \xrightarrow{\text{HCl}}$$
$$\text{HOOC}-\text{CH}_2-\text{CH}_2-\text{S}-\text{CH}_2-\text{CH}_2-\text{S}-\text{CH}_2-\text{CH}_2-\text{COOH}$$
4,7-dithia-decanedioic acid 2.
$$2\text{HOOC}-\text{CH}_2-\text{SH} + \text{ClCH}_2-\text{CH}_2\text{Cl} + 4\text{NaOH} \xrightarrow{\text{HCl}}$$
$$\text{HOOC}-\text{CH}_2-\text{S}-\text{CH}_2-\text{CH}_2-\text{S}-\text{CH}_2-\text{COOH}$$
3,6-dithia-octanedioic acid 3.
$$2\text{HOOC}-\text{CH}_2-\text{CH}_2-\text{SH} + \text{ClCH}_2-\text{CH}_2-\text{CH}_2\text{Cl} + 4\text{NaOH} \xrightarrow{\text{HCl}}$$
$$\text{HOOC}-\text{CH}_2-\text{CH}_2-\text{S}-\text{CH}_2-\text{CH}_2-\text{CH}_2-\text{S}-\text{CH}_2-\text{CH}_2-\text{COOH}$$
4,8-dithia-undecanedioic acid 4.
$$2\text{HOOC}-\text{CH}_2-\text{SH} + \text{ClCH}_2-\text{CH}_2-\text{CH}_2\text{Cl} + 4\text{NaOH} \xrightarrow{\text{HCl}}$$
$$\text{HOOC}-\text{CH}_2-\text{S}-\text{CH}_2-\text{CH}_2-\text{CH}_2-\text{S}-\text{CH}_2-\text{COOH}$$
3,7-dithia-nonanedioic acid 5.
$$2\text{HOOC}-\text{CH}_2-\text{CH}_2-\text{SH} + \text{ClCH}_2-\text{CH}_2-\text{CH}_2-\text{CH}_2\text{Cl} + 4\text{NaOH} \xrightarrow{\text{HCl}}$$
$$\text{HOOC}-\text{CH}_2-\text{CH}_2-\text{S}-\text{CH}_2-\text{CH}_2-\text{CH}_2-\text{CH}_2-\text{S}-\text{CH}_2-\text{CH}_2-\text{COOH}$$
4,9-dithia-dodecanedioic acid 6.
$$2\text{HOOC}-\text{CH}_2-\text{SH} + \text{ClCH}_2-\text{CH}_2-\text{CH}_2-\text{CH}_2\text{Cl} + 4\text{NaOH} \xrightarrow{\text{HCl}}$$
$$\text{HOOC}-\text{CH}_2-\text{S}-\text{CH}_2-\text{CH}_2-\text{CH}_2-\text{CH}_2-\text{S}-\text{CH}_2-\text{COOH}$$
3,8-dithia-decanedioic acid 7.
$$2\text{HOOC}-\text{CH}_2-\text{SH} + \text{ClCH}_2\text{Cl} + 4\text{NaOH} \xrightarrow{\text{HCl}}$$
$$\text{HOOC}-\text{CH}_2-\text{S}-\text{CH}_2-\text{S}-\text{CH}_2-\text{COOH}$$
3,5-dithia-heptanedioic acid 8.
$$2\text{HOOC}-(\text{CH}_2)_4-\text{SH} + \text{ClCH}_2-\text{CH}_2\text{Cl} + 4\text{NaOH} \xrightarrow{\text{HCl}}$$
$$\text{HOOC}-(\text{CH}_2)_4-\text{S}-\text{CH}_2-\text{CH}_2-\text{S}-(\text{CH}_2)_4-\text{COOH}$$
6,9-dithia-tetradecanedioic acid 9.
$$2\text{HOOC}-(\text{CH}_2)_6-\text{SH} + \text{ClCH}_2-\text{CH}_2-\text{CH}_2\text{CH}_2\text{Cl} + \text{NaOH} \xrightarrow{\text{HCl}}$$
$$\text{HOOC}-(\text{CH}_2)_6-\text{S}-\text{CH}_2-\text{CH}_2-\text{CH}_2-\text{CH}_2-\text{S}-(\text{CH}_2)_6-\text{COOH}$$
8,13-dithia-cosanedioic acid 10.
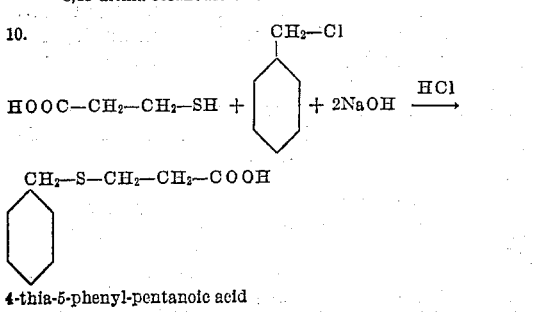
4-thia-5-phenyl-pentanoic acid 11.
$$\text{HOOC}-\text{CH}_2-\text{CH}_2-\text{SH} + \text{CH}_2=\text{CHCH}_2\text{Cl} + 2\text{NaOH} \xrightarrow{\text{HCl}}$$
$$\text{CH}_2=\text{CH}-\text{CH}_2-\text{S}-\text{CH}_2-\text{CH}_2\text{COOH}$$
4-thia-heptene-6-oic acid 12.
$$2\text{HOOC}-\text{CH}_2-\text{CH}_2-\text{SH} + \text{CH}_3-\text{CHCl}_2 + 4\text{NaOH} \xrightarrow{\text{HCl}}$$
$$\text{CH}_3\text{CH}\begin{array}{l}\diagup\text{S}-\text{CH}_2-\text{CH}_2-\text{COOH}\\ \diagdown\text{S}-\text{CH}_2-\text{CH}_2-\text{COOH}\end{array}$$
4,6-dithia-5-methyl-nonanedioic acid 13.
$$3\text{HOOC}-\text{CH}_2-\text{CH}_2-\text{SH} + \text{CHCl}_3 + 6\text{NaOH} \xrightarrow{\text{HCl}}$$
$$\text{HC}\begin{array}{l}-\text{S}-\text{CH}_2-\text{CH}_2-\text{COOH}\\ -\text{S}-\text{CH}_2-\text{CH}_2-\text{COOH}\\ -\text{S}-\text{CH}_2-\text{CH}_2-\text{COOH}\end{array}$$
4,6-dithia-5-(2-carboxyethylthio)-nonanedioic acid 14.
$$3\text{HOOC}-\text{CH}_2-\text{CH}_2-\text{SH} + \text{CHCl}_2-\text{CH}_2\text{Cl} + 6\text{NaOH} \xrightarrow{\text{HCl}}$$
$$\begin{array}{l}\text{S}-\text{CH}_2-\text{CH}_2-\text{COOH}\\ \text{H}-\text{C}-\text{S}-\text{CH}_2-\text{CH}_2-\text{COOH}\\ \text{H}_2\text{C}-\text{S}-\text{CH}_2-\text{CH}_2-\text{COOH}\end{array}$$
5-(2-carboxyethylthio)-4,7-dithiadecanedioic acid 15.
$$4\text{HOOC}-\text{CH}_2-\text{CH}_2-\text{SH} + \overset{\text{CHCl}_2}{\underset{\text{CHCl}_2}{|}} + 8\text{NaOH} \xrightarrow{\text{HCl}}$$
$$\text{HOOC}-\text{CH}_2-\text{CH}_2-\text{S}-\overset{\text{H}}{\underset{\text{H}}{\text{C}}}-\text{S}-\text{CH}_2-\text{CH}_2-\text{COOH}$$
$$\text{HOOC}-\text{CH}_2-\text{CH}_2-\text{S}-\overset{}{\underset{}{\text{C}}}-\text{S}-\text{CH}_2-\text{CH}_2-\text{COOH}$$
4,7-dithia-5,6-(di-2-carboxyethylthio)-decanedioic acid
(tetrakis (2-carboxyethylthio) ethane)

The reaction of this invention is best carried out in the presence of a water solution containing sufficient dissolved alkali to neutralize all of the acid present or formed in the reaction. Preferably, the mercapto-acid is added to the water-alkali solution in a cooling bath. After the addition is complete, the cooling bath is removed and the chlorinated hydrocarbon compound is added to the mixture, and this reaction mixture is refluxed at a temperature at or near the refluxing temperature of water. Accordingly, temperatures in the range of from 80° C. to 105° C. are preferred, but temperatures as low as 25° C. and as high as 150° C. may be used with good results. The reaction takes place rapidly and is complete in most cases in from thirty minutes to two hours. The reaction mixture is then allowed to cool to room temperature and hydrochloric acid is added. A precipitate forms which is filtered, dried, and purified by recrystallizing from an organic solvent to produce the pure sulfur-containing acid.

The following specific examples illustrate the reaction of this invention, but are not intended to limit the invention, for there are, of course, numerous modifications. In the examples all parts are by weight.

*Example I*

164 parts (4.05 moles) of sodium hydroxide are dissolved in 1500 parts of water maintained in a cooling bath. 218 parts (2.05 moles) of beta-mercaptopropionic acid are then added slowly and with constant stirring. The cooling bath is then removed and 99 parts (1.0 mole) of 1,2-dichloroethane added. The mixture is then heated at a temperature of 96°–104° C. for a period of 45 minutes. 500 parts of dilute hydrochloric acid are then added and the precipitate which forms is filtered, washed with hexane, and dried for forty-eight hours at 75° C. 230 parts (96.7% conversion based on the ethylene dichloride) of 4,7- dithia-decanedioic acid (M. P. 156°–160° C.) are formed.

*Example II*

164 parts (4.1 moles) of sodium hydroxide are dissolved in 1000 parts of water maintained in cooling bath. 189 parts (2.05 moles) of mercaptoacetic acid are then added slowly and with constant stirring. The cooling bath is then removed and 99 parts (1.0 mole) of 1,2-dichloroethane added. The mixture is then heated at a temperature of 105° C. for a period of 90 minutes. After the mixture cools, 175 parts of concentrated hydrochloric acid are added, and a precipitate slowly forms. The precipitate is filtered and recrystallized from methyl ethyl ketone, and the filtrate is extracted with ether. After the ether is removed the residue solidifies. A total of 189.5 parts (90.2%) of 3,6-dithia-octanedioic acid (M. P. 105.5° C.–108.5° C.) are formed.

Calculated for $C_6H_{10}O_4S_2$:
Per cent H_____ 4.77
Per cent C_____ 34.22
Per cent S_____ 30.45
Neutralization equivalent_____ 105.06

Found for $C_6H_{10}O_4S_2$:
Per cent H_____ 4.76
Per cent C_____ 34.29
Per cent S_____ 30.43
Neutralization equivalent_____ 105

*Example III*

164 parts (4.1 moles) of sodium hydroxide are dissolved in 1500 parts of water maintained in a cooling bath. 218 parts (2.05 moles) of beta-mercaptopropionic acid are then added with constant stirring. If desired, nitrogen gas is continuously bubbled through the reaction mixture to prevent the oxidation of the beta-mercaptopropionic acid and thereby enhance the yield of the desired product. The cooling bath is then removed and 113 parts (1 mole) of trimethylene dichloride added. The reaction mixture is then heated to a temperature of 103° C. for a period of 55 minutes. After adding 500 parts of water, 500 parts of dilute hydrochloric acid are added. A precipitate of 202 parts (80.3%) of 4,8-dithiaundecanedioic acid (M. P. 109.5° C.–111.5° C.) is formed.

Calculated for $C_9H_{16}O_4S_2$:
Per cent H_____ 6.40
Per cent C_____ 42.85
Per cent S_____ 25.38
Neutralization equivalent_____ 126

Found for $C_9H_{16}O_4S_2$:
Per cent H_____ 6.41
Per cent C_____ 42.83
Per cent S_____ 25.40
Neutralization equivalent_____ 127

*Example IV*

246 parts (6.15 moles) of sodium hydroxide are dissolved in 1500 parts of water maintained in a cooling bath. 283 parts (3.075 moles) of mercaptoacetic acid are then added with constant stirring. The cooling bath is removed and 170 parts (1.5 moles) of trimethylene chloride added. The reaction mixture is then heated to a temperature of 98° C. to 102° C. for a period of 10 minutes. 690 parts of concentrated hydrochloric acid are added after the mixture cools to about 50° C. 295 parts (87.8%) of 3,7-dithia-nonanedioic acid are formed.

Calculated for $C_7H_{12}O_4S_2$:
Per cent H_____ 5.35
Per cent C_____ 37.54
Neutralization equivalent_____ 112

Found for $C_7H_{12}O_4S_2$:
Per cent H_____ 5.38
Per cent C_____ 37.55
Neutralization equivalent_____ 112

*Example V*

208 parts (5.2 moles) of sodium hydroxide are dissolved in 1500 parts of water maintained in a cooling bath. 159 parts (1.25 moles) of 1,4-dichlorobutane are dissolved in 276 parts (2.6 moles) of beta-mercapto-propionic acid and this mixture is rapidly added to the sodium hydroxide solution. The reaction mixture is then heated to a temperature of 85° C. to 95° C. for a period of 120 minutes. 460 parts of concentrated hydrochloric acid are then added. A precipitate forms and after it is filtered, washed and recrystallized from a mixture of acetic acid and benzene 153.5 parts (45.8%) of 4,9-dithia-dodecandioic acid are formed.

Calculated for $C_{10}H_{14}O_4S_2$:
Per cent H_____ 6.77
Per cent C_____ 45.1
Per cent S_____ 24.05
Neutralization equivalent_____ 133

Found for $C_{10}H_{14}O_4S_2$:
Per cent H_____ 6.80
Per cent C_____ 45.07
Per cent S_____ 24.02
Neutralization equivalent_____ 133

*Example VI*

216 parts (5.4 moles) of sodium hydroxide are dissolved in 1200 parts of water maintained in a cooling bath. 159 parts (1.25 moles) of 1,4-dichlorobutane are dissolved in 248 parts (2.7 moles) of mercaptoacetic acid and 395 parts of ethyl alcohol and this mixture is added rapidly to the sodium hydroxide-water mixture. The reaction mixture is then heated at a temperature of 78° to 80° C. for a period of 120 minutes. After cooling to a temperature of 65° C., 542 parts of concentrated hydrochloric acid are added. At this point two layers form and the lower layer is drawn off and washed successively with benzene, ethyl alcohol, and ethyl ether. 151 parts (51.1%) of 3,8-dithia-decanedioic acid are formed.

*Example VII*

120 parts (3 moles) of sodium hydroxide are dissolved in 1200 parts of water maintained in a cooling bath. 159 parts (1.5 moles) of beta-mercapto-propionic acid are then added very slowly and with constant stirring. 190 parts (1.5 moles) of benzyl chloride are then added and the cooling bath is removed. The reaction mixture is heated to a temperature of 104° C. for a period of 145 minutes after which the mixture is allowed to cool to room temperature. 230 parts of concentrated hydrochloric acid are then added and the mixture is cooled in an ice bath. A lower layer is formed which solidified on cooling. The solidified material is then filtered and washed with benzene. It is then recrystallized from benzene and 279 parts (94.9%) of 4-thia-5-phenyl pentanoic acid are formed.

Calculated for $C_{10}H_{12}O_2S$:
- Per cent H ........................... 6.12
- Per cent C ........................... 61.2
- Per cent S ........................... 15.32
- Neutralization equivalent ............ 196

Found for $C_{10}H_{12}O_2S$:
- Per cent H ........................... 6.11
- Per cent C ........................... 61.25
- Per cent S ........................... 16.33
- Neutralization equivalent ............ 194.3

Although specific examples have been herein described, it is not intended to limit the invention thereto, for numerous variations in proportions and reaction conditions will be apparent to those skilled in the art and are within the spirit and scope of the appended claims.

We claim:

1. A method of preparing a compound of the formula $$A(S-R-\underset{\underset{O}{\|}}{C}-OH)_x$$

wherein A is a saturated aliphatic hydrocarbon radical having its connecting valences on saturated carbon atoms, R is alkylene, and $x$ is a number equal to the valence of A, which comprises reacting a mercapto-acid of the formula $$HS-R-\underset{\underset{O}{\|}}{C}-OH$$

wherein R is alkylene, with a compound of the formula $A(Cl)_x$, wherein A is a saturated aliphatic hydrocarbon radical having its connecting valences on saturated carbon atoms, and $x$ is a number equal to the valence of A, in an aqueous medium in the presence of an alkali metal hydroxide, and then acidifying the reaction mixture.

2. A method of preparing a compound of the formula $$A(S-R-\underset{\underset{O}{\|}}{C}-OH)_x$$

wherein A is a saturated aliphatic hydrocarbon radical of less than 8 carbon atoms having its connecting valences on saturated carbon atoms, R is alkylene, and $x$ is a number equal to the valence of A, which comprises reacting a mercapto-acid of the formula $$HS-R-\underset{\underset{O}{\|}}{C}-OH$$

wherein R is alkylene, with a compound of the formula $A(Cl)_x$, wherein A is a saturated aliphatic hydrocarbon radical of less than 8 carbon atoms having its connecting valences on saturated carbon atoms, and $x$ is a number equal to the valence of A, in an aqueous medium in the presence of an alkali metal hydroxide, and then acidifying the reaction mixture.

3. A method of preparing a compound of the formula $$HO-\underset{\underset{O}{\|}}{C}-R-S-A-S-R-\underset{\underset{O}{\|}}{C}-OH$$

wherein R is alkylene and A is a saturated aliphatic hydrocarbon radical of less than 8 carbon atoms having its connecting valences on saturated carbon atoms, which comprises reacting a mercapto-acid of the formula $$HS-R-\underset{\underset{O}{\|}}{C}-OH$$

wherein R is alkylene, with a compound of the formula Cl—A—Cl wherein A is a saturated aliphatic hydrocarbon radical of less than 8 carbon atoms having its connecting valences on saturated carbon atoms, in the presence of an aqueous solution of an alkali metal hydroxide, and then acidifying the reaction mixture.

4. A method of preparing 4,7-dithia-decandioic acid of the formula $$HO-\underset{\underset{O}{\|}}{C}-CH_2-CH_2-S-CH_2-CH_2-S-CH_2-CH_2-\underset{\underset{O}{\|}}{C}-OH$$

which comprises reacting beta-mercaptopropionic acid with 1,2-dichloroethane in the presence of an aqueous solution of an alkali metal hydroxide, and then acidifying the reaction mixture.

JAMES T. GREGORY.
JACOB E. JANSEN.

REFERENCES CITED

The following references are of record in the file of this patent:

Beilstein: Organische Chemie, vol. 6, 4th ed., p. 463 (1923).

Welde: Journ. Prak. Chem. (2), vol. 15, p. 52 (1877).

Suter et al.: Beilstein, Handbuch der Org. Chem. (4th ed.), vol. 6, p. 463 (1923).

Benary: Beilstein, Handbuch der Org. Chem. (4th ed.), vol. 3, sup., p. 95 (1929).

Rothstein et al.: Beilstein, Handbuch der Org. Chem. (4th ed.), vol. 3, 2nd sup., p. 176 (1942).